US007376555B2

(12) United States Patent
Schuijers et al.

(10) Patent No.: US 7,376,555 B2
(45) Date of Patent: May 20, 2008

(54) ENCODING AND DECODING OF OVERLAPPING AUDIO SIGNAL VALUES BY DIFFERENTIAL ENCODING/DECODING

(75) Inventors: Erik Gosuinus Petrus Schuijers, Eindhoven (NL); Arnoldus Werner Johannes Oomen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 742 days.

(21) Appl. No.: 10/496,710

(22) PCT Filed: Nov. 13, 2002

(86) PCT No.: PCT/IB02/04776

§ 371 (c)(1),
(2), (4) Date: May 25, 2004

(87) PCT Pub. No.: WO03/046889

PCT Pub. Date: Jun. 5, 2003

(65) Prior Publication Data

US 2005/0021326 A1 Jan. 27, 2005

(30) Foreign Application Priority Data

Nov. 30, 2001 (EP) ................................ 01204653

(51) Int. Cl.
*G10L 19/04* (2006.01)
*H04B 14/06* (2006.01)
*H04B 1/66* (2006.01)

(52) U.S. Cl. ........................ 704/211; 704/500; 375/244

(58) Field of Classification Search ................ 704/211, 704/219, 220, 500, 501, 503; 375/244

See application file for complete search history.

(56) References Cited

U.S. PATENT DOCUMENTS

| | | | | |
|---|---|---|---|---|
| 5,109,417 | A * | 4/1992 | Fielder et al. .............. | 704/205 |
| 5,227,990 | A * | 7/1993 | Vaupel et al. ............... | 708/303 |
| 5,850,403 | A * | 12/1998 | Lasne ......................... | 714/755 |
| 5,928,376 | A * | 7/1999 | Dettmar et al. ............. | 714/782 |
| 6,345,246 | B1 * | 2/2002 | Moriya et al. .............. | 704/219 |
| 6,377,916 | B1 * | 4/2002 | Hardwick ................... | 704/208 |
| 6,519,558 | B1 * | 2/2003 | Tsutsui ....................... | 704/207 |
| 6,584,437 | B2 * | 6/2003 | Heikkinen et al. .......... | 704/207 |
| 6,691,090 | B1 * | 2/2004 | Laurila et al. .............. | 704/250 |

(Continued)

OTHER PUBLICATIONS

McCourt et al., "Transform coding at 4.8 kbit/sec using interleaving of transform frames and dual gain-shape vector quantization", ICASSP-93, International Conference on Acoustics, Speech, and Signal Processing, 1993, Apr. 27-30, 1993, vol. 2, pp. 624 to 627.*

*Primary Examiner*—Martin Lerner

(57) ABSTRACT

Coding a signal is provided, wherein a first set of values is provided related to subsequent times in a first time interval of the signal, a second set of values is provided related to subsequent times in a second time interval of the signal, the first time interval having an overlap with the second time interval, the overlap including at least two subsequent times of the second interval, wherein at least one of the values of the second set related to the at least two subsequent times in the overlap is encoded with reference to a value of the first set which is closer in time to the at least one value of the second set than any other value in the second set.

16 Claims, 2 Drawing Sheets

U.S. PATENT DOCUMENTS 6,889,183 B1 * 5/2005 Gunduzhan ................. 704/207
2003/0081685 A1 * 5/2003 Montgomery .......... 375/240.24
2005/0261896 A1 * 11/2005 Schuijers et al. ........... 704/219

* cited by examiner

ENCODING AND DECODING OF OVERLAPPING AUDIO SIGNAL VALUES BY DIFFERENTIAL ENCODING/DECODING

The invention relates to coding a signal, in particular an audio signal.

Audio coding schemes are known which use frames that include a set of values representing (a component of) the audio signal in the time interval to which the frame relates. At least some frames relate to time intervals having an overlap in time. In order to achieve a low bit-rate, the redundancy between values obtained at successive time-instants can be exploited by employing, e.g. differential, coding techniques.

An object of the invention is to provide advantageous coding. To this end, the invention provides a method of coding, an encoder, a bit-stream, a storage medium, a method of decoding, a decoder, a transmitter, a receiver and a system as defined in the independent claims. Advantageous embodiments are defined in the dependent claims.

A first aspect of the invention provides coding a signal, the coding comprising providing a first set of values related to subsequent times in a first time interval of the signal, providing a second set of values related to subsequent times in a second time interval of the signal, wherein the first time interval has an overlap (in time) with the second time interval, the overlap including at least two subsequent times of the second interval, wherein at least one of the values of the second set related to the at least two subsequent times in the overlap is encoded with reference to a value of the first set which is closer in time to the at least one value of the second set than any other value in the second set. By encoding at least one value of the second set with reference to a value of the first set which is closer in time to the at least one value of the second set than any other value in the second set, a better exploitation of redundancy in the values is achieved. This aspect of the invention is based on the insight that when using overlapping time intervals, it might happen that in the other set, a value is related to a time which time is closer to the time of the current value of the second set to be encoded than any value available in the second set. Because in general, values are more correlated when closer in time, the in general better correlation can be used to code the signal more efficiently.

The subsequent times may be time instants (or points) or time spans smaller than the time interval (e.g. related to sub-frames). The second time interval will usually be subsequent in time to the first time interval, but may also be preceding the first time interval.

The overlapping times are not necessarily identical, the times of the second time interval may have an offset relative to the times of the first time interval. In the case that the times are time instants, the differences in time between subsequent time instants in the first time interval are not necessarily the same as the differences in time between the subsequent time instants in the second time interval. Further, if the times are time spans, they have not necessarily the same length within the respective time interval or relative to the other time interval. In preferred embodiments the number of times per time interval is the same for the first time interval and the second time interval and the times are (substantially) evenly distributed over the respective time intervals.

The sets of values may be included in frames or sub-frames.

Although the invention is applicable to any coding scheme which uses frames related to overlapping time intervals and any kind of values, the invention is advantageously applied in a parametric audio coding schemes, wherein the values are e.g. gains of a noise component in the audio signal.

These and other aspects of the invention will be apparent from and elucidated with reference to the accompanying drawings.

Figure 1:
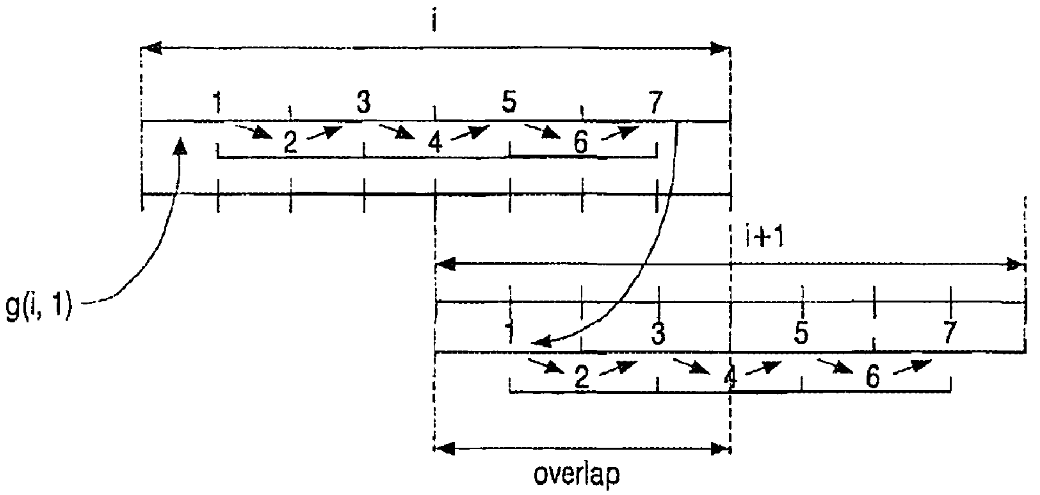
PRIOR ART FIG. 1
FIG. 1 shows an illustration of the use frames which relate to overlapping time intervals, with conventional differential encoding to illustrate the insight of the invention.

The drawings only show those elements that are necessary to understand the embodiments of the invention. The numbers in the drawings denote serial numbers of the values in a given sub-frame, subsequent serial numbers being related to subsequent times in the respective time interval to which the given sub-frame relates.

In a preferred parametric coding scheme, the input signal is typically dissected into transient signal components, sinusoidal signal components and noise components. Reference is made to WO 01/69593-A1. The parameters representing the sinusoidal components are typically chosen to be amplitude, frequency and phase. For the transient components the extension of such parameters with an envelope description is an efficient representation of the transient component. With respect to the noise, the spectral shape and a gain parameter controlling a random noise generator, represent an efficient parametric representation. In order to encode all these parameters with sufficient low bit-rate, redundancy between these parameters at successive time-instances must be exploited. For example, in the case of the sinusoidal components, the amplitude and frequency parameters of a single component are slowly varying in time. It is therefore beneficial to encode the changes in amplitude and frequency. Per analysis frame a single parameter for frequency and amplitude is to be encoded.

In the case of the parameterization of the noise signal, a number of e.g. 7 gain parameter values are obtained per sub-frame, each gain value representing the power in a sub-sub-frame where it relates to. A number of sub-frames are included in a noise frame. The analysis frames are e.g. 50% overlapping. This is visualized in FIG. 1. In practical embodiments, the time spans of the sub-sub-frames are of a same or similar length for each sub-frame.

Due to the slowly varying nature of the gain parameters, redundancy is exploited by encoding these parameters differentially. For that purpose the estimated gain parameters are organized sequentially. The differences are subsequently entropy encoded.

$$\ldots g(i-1,7)\ g(i,1)\ g(i,2)\ \ldots\ g(i,6)\ g(i,7)\ g(i+1,1)\ g(i+1,2)\ \ldots\ g(i+1,6)\ g(i+1,7)\ \ldots$$

where g(a, b) denotes the $b^{th}$ noise gain representation level of sub-frame a. Finally these differential representation levels are entropy encoded using a Huffman table.

According to embodiments of the invention, the estimated parameter values, in this example the gain parameters, are organized such that the redundancy is even better exploited. With respect to conventional coding, a simple change to the bit-stream syntax results in an improvement in coding efficiency.

Approach 1

Figure 2:
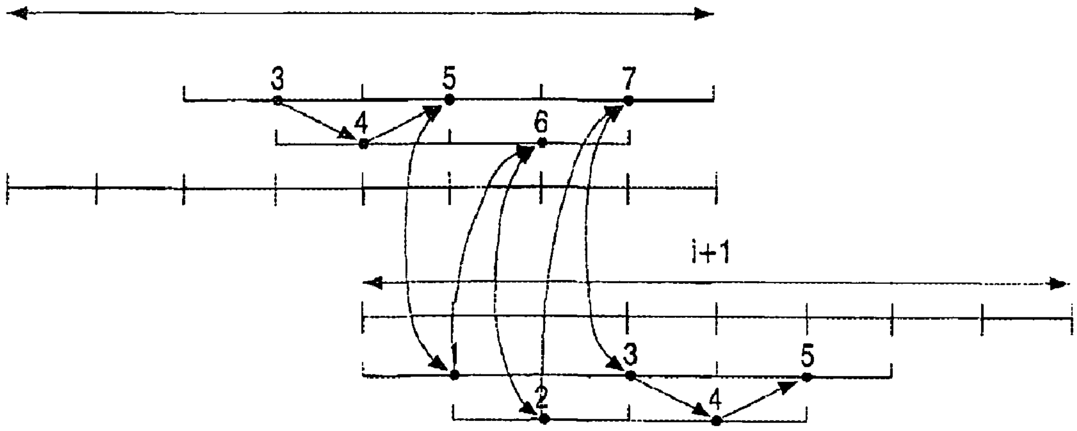
FIG. 2 shows encoding according to a first embodiment of the invention.

In the parametric coding example the estimated noise gains are organized as follows (see also FIG. 2):

. . . g(i,3) g(i,4) g(i,5) g(i+1,1) g(i,6) g(i+1,2) g(i,7) g(i+1,3) g(i+1,4) g(i+1,5) . . .

The thus obtained sequence of gain parameters is preferably differentially encoded.

Approach 2

Figure 3:
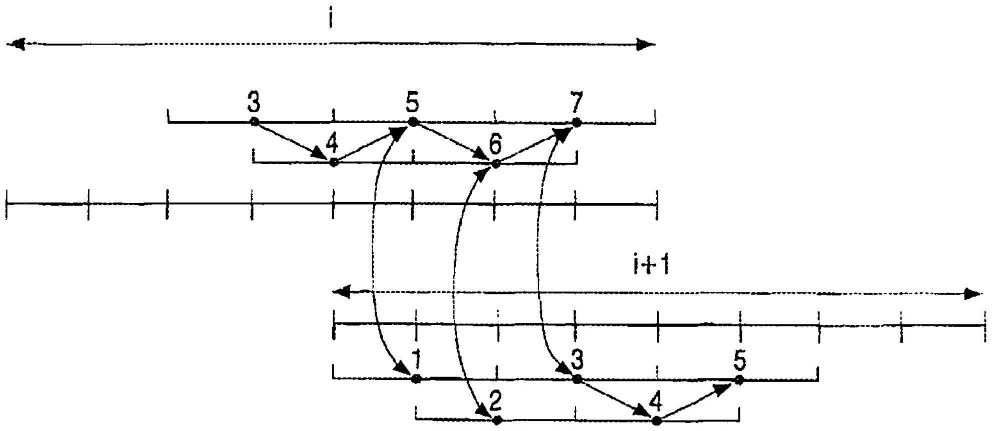
FIG. 3 shows encoding according to a second embodiment of the invention.

The following approach, which proved to be slightly more efficient in the case of the parametric coding example, is as follows (see also FIG. 3):

Step A) first for frame i the gains are organized as: g(i,3) g(i, 4) g(i,5) g(i,6) g(i,7) which are then be (preferably differentially) encoded.

Step B) Then the pairs g(i,5) g(i+1,1), g(i,6) g(i+1,2) and g(i,7) g(i+1,3) are (preferably differentially) encoded Approach 3

Further investigation showed that the three inter-frame differences g(i+1,1)-g(i,5), g(i+1,2)-g(i,6) and g(i+1,3)-g(i, 7) have much similarity. Therefore, it is even more efficient to encode the mean m of these differences and then code the differences with respect to this mean. This thus means that an extra parameter, the mean difference, is included in the bit-stream.

As a comparison of the different approaches consider the following example:

| Gain value | Value |
|---|---|
| g(i,5) | 12 |
| g(i,6) | 16 |
| g(i,7) | 8 |
| g(i + 1,1) | 15 |
| g(i + 1,2) | 20 |
| g(i + 1,3) | 13 |

For the different approaches as described above using differential encoding this would deliver the sequences:

| Original approach | Approach 1 | Approach 2 | Approach 3 |
|---|---|---|---|
| . . | . . | . | . . |
| . . | . . | . | . . |
| . . | . . | . | . . |
| +4 (16 − 12) | +3 (15 − 12) | +4 (16 − 12) | +4 (16 − 12) |
| −8 (8 − 16) | +1 (16-15) | −8 (8-16) | −8 (8-16) |
| +7 (15 − 8) | +4 (20 − 16) | 3 (15 − 12) | +4 (mean m*) |
| +5 (20 − 5) | −12 (8 − 20) | +4 (20 − 16) | −1 (15 − 12-m) |
| −7 (20 − 13) | +5 (13 − 8) | +5 (13 − 8) | 0 (20 − 16-m) |
| . . | . . | . . | 1 (13 − 8-m) |
| . . | . . | . . | |
| . . | . . | . . | |

*The mean m is calculated as ((15 − 12) + (20 − 16) + (13 − 8))/3 = 4.

Note that even though in approach 3 an extra parameter is added the resulting sequence can be encoded more efficiently.

In a practical embodiment of noise frame encoding, each sub-frame defines or updates filter parameters which remain constant over the sub-frame. Per sub-frame several subsequent gain parameter values are given which relate to subsequent times in the time interval to which the sub-frame relates. The sub-frames overlap in time. A refresh noise frame is defined which starts with a sub-frame comprising refresh filter parameters which are encoded as absolute filter parameters. Filter parameters in other sub-frames are mainly differentially encoded.

In a preferred practical embodiment, the following coding strategy is used: For the first sub-frame of a 'refresh-frame' the first noise gain is coded absolutely. All following noise gains of that sub-frame are encoded differentially. For all other sub-frames instead of encoding the difference g(i+1, 1)-g(i,7) the difference g(i+1,1)-g(i,5) is encoded, thus exploiting the redundancy that is apparent between noise-gains that are analyzed at similar time-instances. The same is repeated for g(i+1,2) and g(i+1,3). So, instead of encoding the difference g(i+1,2)-g(i+1,1) respectively g(i+1,3)-g(i+1, 2), the difference g(i+1,2)-g(i,6) respectively g(i+1,3)-g(i,7) is encoded (see also FIG. 2).

In an even more preferred practical embodiment, the following coding strategy is used:

For the first sub-frame of a 'refresh-frame' the first noise gain is coded absolutely. All following noise gains of that sub-frame are encoded differentially. For any other sub-frame i+1 the differences g(i+1,1)-g(i,5), g(i+1,2)-g(i,6) and g(i+1,3)-g(i,7) and the mean value m(i+1) of these differences is calculated. First the mean value m(i+1) is encoded into the bit-stream, followed by the differences g(i+1,1)-g (i,5)-m(i+1), g(i+1,2)-g(i,6)-m(i+1) and g(i+1,3)-g(i,7)-m(i+ 1) which represent the differences to the mean value. Finally the values g(i+1,4)-g(i+1,3), g(i+1,5)-g(i+1,4), g(i+1,6)-g(i+ 1,5) and g(i+1,7)-g(i+1,6) are encoded into the bit-stream.

Except for the first sub-frame of a refresh noise frame, first the mean m(i+1) of the overlapping differences is inserted just after the differential parameters representing the filter. Immediately after the mean m(i+1), the differences to the mean value m(i+1) are inserted into the bit-stream. For the non-overlapping gain values the parameters are encoded differentially. This embodiment results in the following bit-stream syntax:

```
first sub-frame of a refresh noise frame (in the above example sub-frame
i)
    {
    refresh filter parameters
    first absolute gain value (e.g. g(i,1))
    differentially encoded further gain values (e.g. g(i,2)...g(i,7))
    }
other sub-frames of a noise frame (refresh and non-refresh) (e.g. sub-
frame
i+1 in the above example)
    {
    differentially encoded filter parameters
    mean of the overlapping differences (e.g. m(i+1)
    differences of the overlapping gain values to the mean
    differentially encoded non overlapping gain values
    }
```

The mean differential gain coefficient m(i+1) is preferably encoded by using a Huffman table. The differences to the mean m(i+1) are also preferably encoded by using a Huffman table. The other differential noise parameters are also preferably encoded by use of a Huffman table.

In a decoder, the noise gain parameter values in sub-frame i+1 relating to the overlap are obtained by adding the mean m(i+1) and the respective 'difference to the mean value' to the noise gain parameter value of the sub-frame i which value is used as reference value. For example in the above example (see FIG. 3), g(i+1,3)=g(i,7)+m(i+1)+[g(i+1,3)-g(i, 7)-m(i+1)].

Especially speech excerpts which may be critical for parametric encoding benefit from embodiments of the invention. The extra decoder complexity caused by the embodiments of the invention is negligible.

Figure 4:
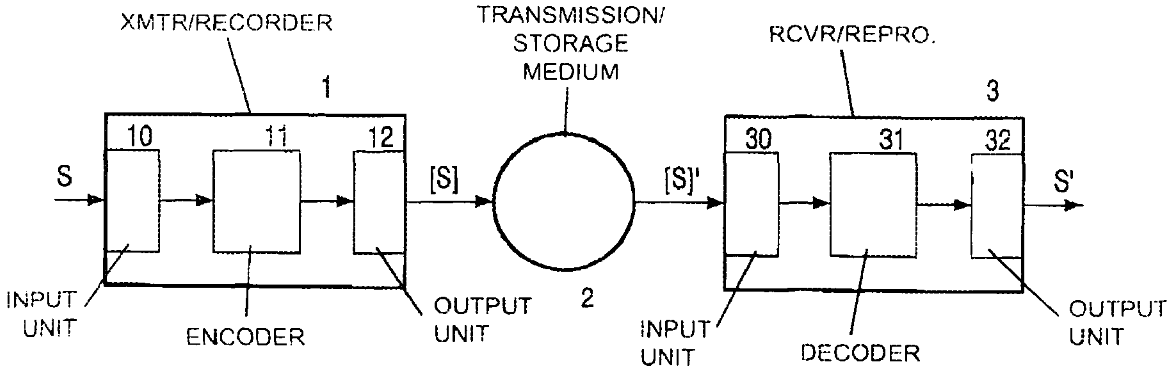
FIG. 4 shows a system according to an embodiment of the invention.

FIG. 4 shows a system according to an embodiment of the invention. The system comprises an apparatus 1 for transmitting or recording an encoded signal [S]. The apparatus 1 comprises an input unit 10 for receiving a signal S, which is preferably an audio signal. The input unit 10 may be an antenna, microphone, network connection, etc. The apparatus 1 further comprises an encoder 11 for encoding the signal S according to an above described embodiment of the invention (see in particular FIGS. 2 and 3) in order to obtain an encoded signal. The encoded signal is furnished to an output unit 12 which transforms the encoded audio signal in bit-stream [S] having a suitable format for transmission or storage via a transmission medium or storage medium 2. The system further comprises a receiver or reproduction apparatus 3 which receives the encoded signal [S] in an input unit 30. The input unit 30 furnishes the encoded signal [S] to the decoder 31. The decoder 31 decodes the encoded signal by performing a decoding process which is an inverse operation of the encoding in the encoder 11. The decoder 31 furnishes the decoded signal S' to an output unit 32 that provides the decoded signal S'. The output unit 32 may be reproduction unit such as a speaker for reproducing the decoded signal S'. The output unit 32 may also be a transmitter for further transmitting the decoded signal S' for example over an in-home network, etc.

Application areas of embodiments of the invention are: Internet download, Internet Radio, Solid State audio.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. This word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of coding an audio signal, the method comprising the steps of:

providing a first set of audio signal values related to subsequent times in a first time interval of the audio signal;

providing a second set of audio signal values related to subsequent times in a second time interval of the audio signal;

the first time interval having an overlap with the second time interval, the overlap including at least two subsequent times of the second interval; and wherein at least one of the audio signal values of the second set related to the at least two subsequent times in the overlap is encoded with reference to an audio signal value of the first set which is closer in time to the at least one audio signal value of the second set than any other audio signal value in the second set.

2. The method as claimed in claim 1, wherein the overlap includes at least two times the first time interval.

3. The method as claimed in claim 1, wherein g(i,b) are the audio signal values in the first set i, and g(i+1,b) are the audio signal values in the second set i+1, wherein b denotes the series number of a given audio signal value in a given set, subsequent series numbers being related to subsequent times, the overlap including k times the second time interval, wherein the audio signal values g(i,b) of the first set and the audio signal values g(i+1,b) of the second set are encoded in the sequence:

. . . g(i,n−k) g(i,n−k+1) g(i+1,1) g(i,n−k+2) g(i+1,2) . . . g(i,n) g(i+1,k) g(i+1,k+1) g(i+1,k+2) . . . , wherein n is the highest series number in the first set.

4. The method as claimed in claim 1, wherein g(i,b) are the audio signal values in the first set i, and g(i+1,b) are the audio signal values in the second set i+1, wherein b denotes the series number of a given audio signal value in a given set, subsequent series numbers being related to subsequent times, the overlap including k times the second time interval, wherein the coding comprises:

encoding the sequence . . . g(i,n−k) g(i,n−k+1) g(i,n−k+2) . . . g(i,n)

encoding the sequence of inter-frame differences g(i+1,1)−g(i,n−k+1), g(i+1,2)−g(i,n−k+2) . . . g(i+1,k)−g(i,n), wherein n is the highest series number in the first set.

5. The method as claimed in claim 4, wherein a mean m(i+1) of the inter-frame differences is determined and wherein the respective inter-frame differences are encoded as differences to said mean.

6. The method as claimed in claim 1, wherein a number of times in the first time interval in the overlap is equal to a number of times in the second time interval in the overlap.

7. The method as claimed in claim 1, wherein the audio signal values are audio signal values of a same type of parameter.

8. The method as claimed in claim 1, wherein the audio signal values are included in respective frames or sub-frames.

9. The method as claimed in claim 1, wherein the encoding is a differential encoding.

10. The method as claimed in claim 1, wherein the audio signal values are gain values of a noise component in the audio signal.

11. An encoder for coding an audio signal, the encoder comprising:

means for providing a first set of audio signal values related to subsequent times in a first time interval of the audio signal;

means for providing a second set of audio a signal values related to subsequent times in a second time interval of the audio signal;

the first time interval having an overlap with the second time interval, the overlap including at least two subsequent times of the second interval, the device further comprising means for encoding at least one of the audio signal values of the second set related to the at least two subsequent times in the overlap with reference to an audio signal value of the first set which is closer in time to the at least one audio signal value of the second set than any other audio signal value in the second set.

12. A transmitter comprising:

an input unit for receiving an audio signal, an encoder as claimed in claim 11 for encoding the audio signal to obtain a an encoded audio signal, and an output unit for providing a bit-stream representing the encoded audio signal.

13. A storage medium having stored thereon a bit-stream representing an encoded audio a signal, the bit-stream comprising:

a first set of encoded audio signal values related to subsequent times in a first time interval, a second set of encoded audio signal values related to subsequent times in a second time interval, the first time interval having an overlap with the second time interval, the overlap including at least two subsequent times of the second interval, wherein at least one of the audio signal values of the second set related to the at least two subsequent times in the overlap has been encoded with reference to an audio signal value of the first set which is closer in time to the at least one audio signal value of the second set than any other audio signal value in the second set.

14. A method of decoding a bit-stream representing an encoded audio signal, the decoding method comprising the steps of:

receiving a first set of encoded audio signal values related to subsequent times in a first time interval;

receiving a second set of encoded audio signal values related to subsequent times in a second time interval;

the first time interval having an overlap with the second time interval, the overlap including at least two subsequent times of the second interval, wherein at least one of the encoded audio signal values of the second set related to the at least two subsequent times in the overlap has been encoded with reference to an audio signal value of the first set which is closer in time to the at least one encoded audio signal value of the second set than any other encoded audio signal value in the second set, the decoding further comprising:

decoding the first set of encoded audio signal values to obtain a first set of decoded audio signal values; and decoding the second set of encoded audio signal values to obtain a second set of decoded audio signal values, the at least one of the encoded audio signal values of the second set related to the at least two subsequent times in the overlap being decoded with reference to the encoded audio signal value of the first set which is closer in time to the at least one encoded audio signal value of the second set than any other encoded audio signal value in the second set.

15. A decoder for decoding a bit-stream representing an encoded audio signal, the decoder comprising:

means for receiving a first set of encoded audio signal values related to subsequent times in a first time interval, means for receiving a second set of encoded audio signal values related to subsequent times in a second time interval, the first time interval having an overlap with the second time interval, the overlap including at least two subsequent times of the second interval, wherein at least one of the encoded audio signal values of the second set related to the at least two subsequent times in the overlap has been encoded with reference to an encoded audio signal value of the first set which is closer in time to the at least one encoded audio signal value of the second set than any other encoded audio signal value in the second set, the device further comprising:

means for decoding the first set of encoded audio signal values to obtain a first set of decoded audio signal values, and means for decoding the second set of encoded audio signal values to obtain a second set of decoded audio signal values, the at least one of the encoded audio signal values of the second set related to the at least two subsequent times in the overlap being decoded with reference to the encoded audio signal value of the first set which is closer in time to the at least one encoded audio signal value of the second set than any other encoded audio signal value in the second set.

16. A receiver comprising:

an input unit for receiving a bit-stream representing an encoded audio signal, a decoder as claimed in claim 15 for decoding the encoded audio signal to obtain a decoded audio signal, and an output unit to provide the decoded audio signal.

* * * * *